(12) United States Patent
Rechter et al.

(10) Patent No.: US 9,302,419 B2
(45) Date of Patent: Apr. 5, 2016

(54) EXTRUDER

(71) Applicant: LEISTRITZ EXTRUSIONSTECHNIK GMBH, Nürnberg (DE)

(72) Inventors: Frank Rechter, Uffenheim OT Welbhausen (DE); Sven Wolf, Oberasbach (DE)

(73) Assignee: LEISTRITZ EXTRUSIONSTECHNIK GMBH, Nürnberg (DE)

( * ) Notice: Subject to any disclaimer, the term of this patent is extended or adjusted under 35 U.S.C. 154(b) by 84 days.

(21) Appl. No.: 14/453,833

(22) Filed: Aug. 7, 2014

(65) Prior Publication Data
US 2015/0045182 A1   Feb. 12, 2015

(30) Foreign Application Priority Data
Aug. 9, 2013  (DE) .................... 10 2013 108 629

(51) Int. Cl.
*B29B 7/72*  (2006.01)
*B29C 47/08*  (2006.01)
(Continued)

(52) U.S. Cl.
CPC .............. *B29C 47/0805* (2013.01); *B29B 7/48* (2013.01); *B29B 7/728* (2013.01); *B29C 47/0801* (2013.01); *B29C 47/40* (2013.01); *B29C 47/92* (2013.01); *F16H 1/22* (2013.01); *B29C 2947/92038* (2013.01);
(Continued)

(58) Field of Classification Search
CPC ........ B29C 47/0805; B29B 7/728; B29B 7/48
See application file for complete search history.

(56) References Cited

U.S. PATENT DOCUMENTS 8,096,698 B2    1/2012  Yamaguchi
2009/0135016 A1*  5/2009  Yamaguchi ........... G01L 5/0071
                                                340/635

FOREIGN PATENT DOCUMENTS

EP       2065162 A2    6/2009
EP       2179834 A2    4/2010
(Continued)

OTHER PUBLICATIONS

First examination report of the Chinese Patent Office, Dec. 2015.
English translation of the first examination report, Dec. 2015.

*Primary Examiner* — Robert Hodge
*Assistant Examiner* — Ryan Dodd
(74) *Attorney, Agent, or Firm* — Lucas & Mercanti, LLP

(57) ABSTRACT

An extruder having an operative unit composed of a cylinder and at least two screw shafts which are rotatably accommodated therein, a gear unit having at least two output shafts, wherein each output shaft, via a connecting element, is connected in a rotationally fixed manner to one screw shaft, a motor which drives the gear unit and is coupled to the gear unit via a clutch, and a controller installation, wherein each connecting element or each output shaft is assigned a separate measuring installation for determining the applied torque, wherein the measuring installations communicate with the controller installation which, depending on the individual determined torques, controls the clutch which is implemented as a switchable clutch, wherein the controller installation is configured for opening the clutch both when a determined torque exceeds a torque limit value and also when the difference between the two determined torques exceeds a limit value.

13 Claims, 1 Drawing Sheet

(51) Int. Cl.
*F16H 1/22* (2006.01)
*B29B 7/48* (2006.01)
*B29C 47/40* (2006.01)
*B29C 47/92* (2006.01)

(52) U.S. Cl.
CPC ............... *B29C 2947/92457* (2013.01); *B29C 2947/92533* (2013.01); *B29C 2947/92952* (2013.01); *Y10T 477/325* (2015.01)

(56) References Cited

FOREIGN PATENT DOCUMENTS

| | | |
|---|---|---|
| GB | 723730 A | 2/1955 |
| JP | H06179212 A | 6/1994 |
| JP | 2000225641 A | 8/2000 |
| JP | 2002113769 A | 4/2002 |
| WO | 2004026559 A1 | 4/2004 |

\* cited by examiner

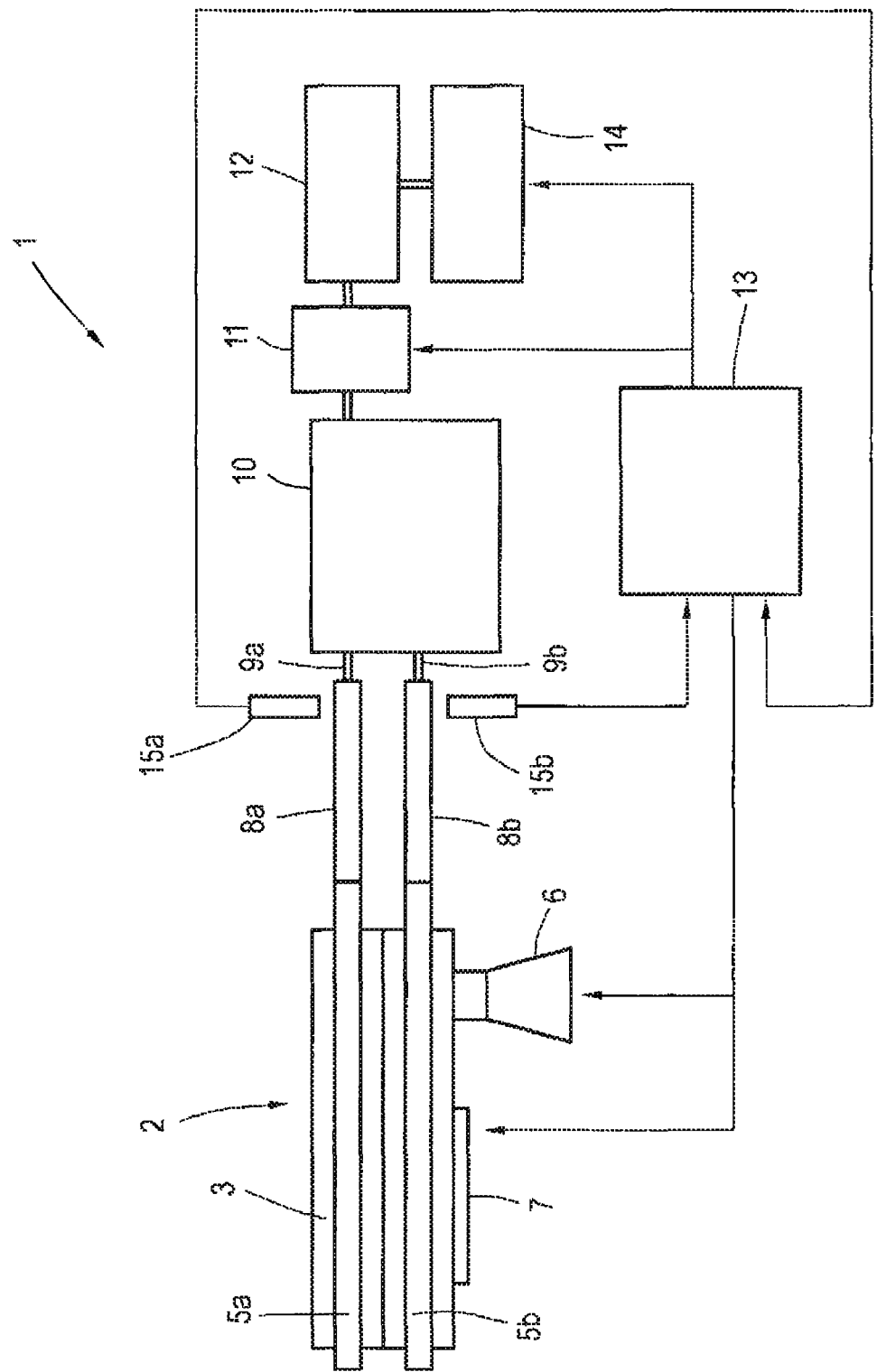

ically-separating clutch in which, for example, spring-loaded balls assigned to one side of the clutch engage in corresponding calottes assigned to the other side of the clutch and, when a cut-out torque is applied, migrate out of the calottes, causing the clutch to slip and open, respectively. Therefore, the cut-out torque has to be applied directly to the clutch; as a result, the actual torque given on the screw shafts is somewhat higher, since there is a certain loss of torque in the mechanical
EXTRUDER The present application claims priority of DE 10 2013 108 629.2, filed Aug. 9, 2013, the priority of this application is hereby claimed and this application is incorporated herein by reference.

BACKGROUND OF THE INVENTION

The invention relates to an extruder comprising an operative unit composed of a cylinder and at least two screw shafts which are rotatably accommodated therein, a gear unit having at least two output shafts, wherein each output shaft, via a connecting element, is connected in a rotationally fixed manner to one screw shaft, a motor which drives the gear unit and is coupled to the gear unit via a clutch, and a controller installation.

As is known, extruders of this type serve for preparing compounds which, in the operative unit or the cylinder, respectively, are processed via one or more screw shafts, also referred to as extruder screws, rotating therein. In only an exemplary manner, mention may be made of plastic compounds which are melted and compounded in the extruder in order to be subsequently further processed, for example for forming plastic granules or in the context of injection-molding or for manufacturing components and similar. In an exemplary manner, mention should furthermore be made of pharmaceutical compounds which serve in the production of pharmaceuticals, for example in the form of tablets. Here too, the corresponding materials are processed and mixed etc. via the screws in the cylinder, in order to achieve the desired homogenous composition of the extruded product. In order to make this possible, one or more installations, such as, for example, corresponding infeed installations, via which the materials to be processed are added in a metered manner, or heating installations, which serve for temperature-controlling the cylinder or the cylinder sections from which such a cylinder is typically assembled, or similar is/are provided on the operative unit or assigned to the operative unit, respectively. Also in the field of foodstuffs, corresponding compounds are often prepared using an extruder.

The drive of the at least two screw shafts is, of course, an essential aspect in the functioning of the extruder, since both the torque of the screws and also the revolutions of the screws, which are relevant to the energy introduced into the material to be prepared, are adjusted via the drive. This takes place via a motor and a corresponding reduction gear unit which is coupled to the screw shaft or screw shafts. The motor is typically coupled to the gear unit via an overload clutch, wherein the overload clutch, having a corresponding given overload on the screws, opens and separates the gear unit from the motor. The in-principle construction and the function of such an extruder are well known.

In the case of an overload, the clutch only opens when the cumulative torque of the two screw shafts that is applied via the output shafts and the gear unit to one side of the clutch is greater than the cut-out torque defined by the concept and the dimensions of the overload clutch. Then, and only then, does the overload clutch open, which overload clutch is a mechanically-separating clutch in which, for example, spring-loaded balls assigned to one side of the clutch engage in corresponding calottes assigned to the other side of the clutch and, when a cut-out torque is applied, migrate out of the calottes, causing the clutch to slip and open, respectively. Therefore, the cut-out torque has to be applied directly to the clutch; as a result, the actual torque given on the screw shafts is somewhat higher, since there is a certain loss of torque in the mechanical train from the screw shafts to the clutch, and respectively a certain time factor also plays a part, since any increase of the torque on the screw shafts is transmitted with some time delay to the clutch. An overload may thus already exist with the screw shafts but not be applied yet to the clutch. This may have disadvantages for the operation of the extruder and, in particular, also for the screw shafts and wear thereof.

SUMMARY OF THE INVENTION

The invention is, therefore, based on the object of providing an extruder which is improved in comparison with the aforementioned.

According to the invention, the objective is achieved by providing an extruder comprising an operative unit composed of a cylinder and at least two screw shafts which are rotatably accommodated therein, a gear unit having at least two output shafts, wherein each output shaft, via a connecting element, is connected in a rotationally fixed manner to one screw shaft, a motor which drives the gear unit and is coupled to the gear unit via a clutch, and a controller installation, wherein each connecting dement or each output shaft is assigned a separate measuring installation for determining the applied torque, wherein the measuring installations communicate with the controller installation which, depending on the individual determined torques, controls the clutch which is implemented as a switchable clutch, wherein the controller installation is configured for opening the clutch both when a determined torque exceeds a torque limit value and also when the difference between the two determined torques exceeds a limit value.

According to the invention, measuring installations are employed which individually measure the torques to be applied or to be assigned to the screw shafts. The measuring installations are in each case assigned to either a connecting element, for example a connecting collar via which a screw shaft end is coupled to an output shaft, or to the output shaft itself, depending on where the respective measuring installation can be best installed. As a result, each measuring installation supplies an individual torque signal which indicates the level of the applied actual torque. Since these signals are, as it were, measured directly on or close to the screw shafts, respectively, they can thus be unequivocally assigned to the corresponding screw shafts.

The torque signals are relayed to the controller installation which processes the former. The individual torque profile of each shaft, or the respective actual torque, respectively, is thus known to the controller installation. Based on this individual torque information, the controller installation, when corresponding marginal conditions and/or triggering conditions prevail, is now configured to activate the clutch which is implemented as a switchable clutch. The clutch may thus be actively opened by applying a control command, irrespective of whether an adequately high cumulative torque has now been applied or not. When observing the real torque conditions on the individual screws, this offers the possibility of being able to open the clutch if and when required in order to protect the extruder or the screw shafts etc., respectively.

A set of particular advantages can be thereby achieved. Above all in the case of extruders which have a plurality of lateral supply features, i.e. infeed installations, which infeed corresponding material from the side, the torque of the left screw shaft may significantly differ from the torque of the right screw shaft. This may lead to one screw already being extremely heavily loaded or overloaded, respectively, while a torque which is still tolerable is applied to the other screw. However, the cumulative torque has not yet reached the value of the cut-out torque, so that a normal clutch would not open. By observing the individual torques of each screw, the overload state on a screw shaft to which a higher torque than the permissible nominal torque is thus applied can be registered however, so that the clutch can be actively opened by activation via the controller installation.

In the case of very long distances, an uneven distribution of the torque among the two screw shafts furthermore leads to uneven twisting of the screw shafts about the longitudinal axis, as a result of which contact may at times take place between the screw elements and an increase in torque may occur. This too may be registered by correspondingly evaluating the individual torques assigned to the screw shafts.

According to the invention, the controller installation is configured for actively opening the clutch when various marginal conditions or triggering conditions exist. According to the invention, the controller installation may open the clutch when a determined torque exceeds a torque limit value. Each screw shaft is thus assigned a defined torque limit value which is in the range of or somewhat above nominal torque. The torque limit value is usually above nominal torque value, since a cut-out torque—if such has been defined—typically corresponds to approx, 120-140% of nominal torque of the two screw shafts. Corresponding torque limit values for the respective screw shafts are therefore stored in the controller installation. These torque limit values may, of course, also vary depending on the type of screw shaft used. In this manner, higher torques can be transmitted via compact screws, i.e. screws machined from a solid block of material, than via so-called screw sets in which individual screw elements are pushed onto a screw shaft. Torque variation may also exist depending on the different operative zones which are configured on the screw shaft and which in each case process the material in a different manner, so that, corresponding thereto, various torque limit values are stored in the controller installation. Depending on which screw shafts are presently installed, the controller installation, based on the corresponding assigned torque limit values, is capable of monitoring whether an actual torque which has been registered via a measuring installation currently reaches or exceeds a torque limit value respectively. In such a case, the clutch is immediately activated so as to be opened, wherein in this case the mathematical cumulative torque, such as it has to be applied just for opening the clutch in the prior art, has not yet been reached.

In addition thereto, the controller installation also opens the clutch when the difference between the two determined torques exceeds a limit value. The actual torques applied to the individual screw shafts may agree but need not agree. This may be a result of the infeed installations working from only one side, for example, i.e. only the one screw shaft being directly charged with newly added material, or similar. In the context of the continuous registration of actual torque and the processing of the corresponding measurement signals, should it now emerge that an excessive difference in torque exists between the individual recorded actual torque values, this may also be assessed to be a cut-out condition leading to the clutch being actively opened by activation of the controller installation.

A further opening condition which, according to the invention, may be additionally implementable to the two aforementioned, fundamentally implemented opening conditions may provide that the controller installation opens the clutch when the gradient of the increase of a determined torque exceeds a gradient limit value. If a very rapid increase of the torque assigned to and registered at the connecting element and the output shaft respectively takes place even on only one screw shaft, this may indicate a looming case of overload. Such a rapid increase may be traced back, for example, to contact between the two screw shafts or to an excessive material density, or similar. If it is now registered on account of the continuous registration of the actual torque and its temporal evaluation that the gradient at which the actual torque value of a screw shaft increases is sufficiently steep and exceeds a gradient limit value, this may also be identified as a direct cut-out condition on the part of the controller installation which subsequently activates and opens the clutch.

A further abort condition which is likewise additionally implemented on the part of the controller installations, as need be, may provide that the controller installation opens the clutch when the temporal profile of a determined torque displays oscillation in which the amplitude is greater than a comparison amplitude. It has emerged that the torque of the operating extruder is not constant but instead always displays slight oscillation. This is the result of material being continuously added, from conveying the material inside the cylinder and, of course, also of the screw rotation itself. Such oscillation is tolerable as long as the amplitude is not excessively high. The controller installation, by evaluating the temporal recorded torque profile, is now capable, on the one hand, of identifying oscillation and, on the other hand, of registering the corresponding amplitude height as well. If the oscillation amplitude is now greater than a comparison amplitude, this comparison result may also be assessed to be a criterion for immediate abortion, leading to the controller installation activating and actively opening the clutch.

As has been described, at least the two first-mentioned cut-out modalities are implemented in the controller installation, wherein preferably ail four cut-out modalities are implemented as software in the controller installation, such that the controller installation is capable of registering the four different cut-out potentials and can react correspondingly.

It is expedient for the controller installation, simultaneously with or immediately after opening the clutch, to activate a frequency inverter in order to reduce the revolutions of the motor. If the clutch is opened, the motor idles, so to speak. It is now expedient for the motor revolutions to be reduced simultaneously with the opening of the clutch or, in a temporal sense, shortly thereafter, which takes place via the controller installation via corresponding activation of a frequency inverter which is upstream of the motor or assigned thereto, respectively. This means that opening of the clutch is also immediately accompanied by a reduction of motor revolutions, wherein the motor may also be switched off or the revolutions may be reduced to zero, respectively.

According to the invention, a switchable clutch is employed. Said switchable clutch may either be pneumatically or electromagnetically actuatable. A pneumatically actuatable switchable clutch operates in such a manner that the two friction disks of the clutch are pressed together by high air pressure. The higher the air pressure, the higher the friction torque and, therefore, the higher the transmittable torque. If the clutch is now to be opened, a corresponding pump or similar is activated via the controller installation and the air pressure is abruptly reduced, such that the friction disks can no longer be actively pressed together and, therefore, the one side of the clutch may freely rotate in relation to the other side of the clutch.

In the case of an electromagnetically actuatable clutch, the one friction disk is pulled toward the other friction disk by way of a sufficiently strong electromagnet or of an assembly comprising a plurality of such electromagnets, or one gear-tooth disk is pulled toward another gear-tooth disk. The higher the force leading to the form fit that is transmitted via this electromagnetic actuating element is, the higher the transmittable torque. If the clutch is now to be opened, the electromagnet or electromagnets is/are switched off, the disks or gear-tooth disks previously being pressed together or pulled toward one another are disengaged, which may happen very abruptly, for example, when they are moved by way of the electromagnets counter to the restoring force of spring elements, etc. Here too, as in the case of pneumatics, the clutch is opened immediately, but always controlled by the controller installation.

The measuring installation itself may be a measuring installation which operates in a non-contacting manner, in particular using a magneto-elastic element. For the latter, the connecting element is preferably used, but the output shafts may also serve this purpose. In this case, the connecting element or the output shafts are provided with residual magnetization which generates a magnetic field which is modifiable depending on the given torque as a result of the loading of the connecting element, or the output shaft, respectively, and thus of the accompanying structural influence. A magnetic sensor which is disposed in a positionally fixed manner, for example a Hall-type sensor or similar, is now capable of registering this magnetic field, or modification of the field, respectively, and of deriving therefrom the level of torque, should this not take place in the controller installation. Torque registration thus takes place by monitoring a magnetic field.

Another measuring installation operating in a non-contacting manner may be an optical measuring installation. Finally, the use of a strain gauge which is disposed on the connecting element or on the output shaft and which supplies a corresponding signal depending on the torsion of the shafts or of the elements is also conceivable. In this case, the measuring installation, so to speak, thus runs concomitantly with the connecting element, or the output shaft, respectively, the signals are acquired in a suitable manner and relayed to the controller installation.

Apart from the extruder itself, the invention furthermore relates to a method for operating an extruder comprising an operative unit composed of a cylinder and at least two screw shafts which are rotatably accommodated therein, a gear unit having at least two output shafts, wherein each output shaft, via a connecting element, is connected in a rotationally fixed manner to one screw shaft, a motor which drives the gear unit and is coupled to the gear unit via a clutch, and a controller installation, wherein each connecting element or each output shaft is assigned a separate measuring installation for determining the applied torque, wherein the measuring installation communicates with the controller installation which, depending on the individual determined torques, opens the clutch, which is implemented as a switchable clutch, both when a determined torque exceeds a torque limit value and also when the difference between the two determined torques exceeds a limit value.

Moreover, the controller installation can additionally open the clutch when the gradient of the increase of a determined torque exceeds a gradient limit value and/or when the temporal profile of a determined torque displays oscillation in which the amplitude is greater than a comparison amplitude.

The controller installation is configured so as to open the clutch when one of the at least two, preferably four triggering conditions defined above is identified, that is to say that the two, in particular all four operating and/or control variants are implemented in the controller installation software.

Of course, the corresponding limit values or comparison values which are required for carrying out the respective torque value analyses or similar are also stored in the controller installation.

It may be furthermore provided according to the method that the controller installation, simultaneously with or immediately after opening the clutch, activates a frequency inverter in order to reduce the revolutions of the motor. That is to say that the controller installation is ultimately capable of transferring the extruder to a secure state, wherein the clutch is opened and the motor has been shut down.

It is essential in the extruder according to the invention and/or the method according to the invention that a condition leading to a cut-out is registered before a correspondingly sufficiently high cut-out torque is actually applied to the clutch and the clutch would ultimately open for purely mechanical reasons. This is because, in this case, the respective actual torques being measured on the screw shafts, or on the connecting elements and output shafts, respectively, are not considered as cumulative torque, but activation is based on them individually. In consequence, torques and torque profiles are considered in the manner in which they are actually applied to the operative components to be protected, that is to say, the screw shaft.

Further advantages, features and details of the invention will be derived from the exemplary embodiment which is described in the following, and from the drawing.

BRIEF DESCRIPTION OF THE DRAWING

The single FIGURE schematically illustrates the inventive extruder.

DETAILED DESCRIPTION OF THE INVENTION

In the FIGURE, an in-principle illustration of an extruder 1 according to the invention is shown, comprising an operative unit 2 having a cylinder 3 which, as is usual in most cases, is composed of a plurality of individual cylinder segments which are lined up next to one another and interconnected. As is shown in a highlighted manner here, two screw shafts 5a, 5b are rotatably accommodated in the cylinder 3. To this end, the cylinder 3 has a cylinder bore which is implemented as a figure-eight barrel bore, as is known per se.

In an exemplary manner, a further installation in the form of an infeed installation 6 is disposed on, or assigned to, respectively, the operative unit 2, wherein, of course, a plurality of such infeed installations 6 may also be provided. The material(s) to be processed is/are added via the infeed installation 6. Furthermore provided is a heating installation 7 via which the cylinder 3 can be temperature-controlled and which is also indicated in only an exemplary manner.

The screw shafts 5a, 5b, via respective connecting elements 8a, 8b which are implemented as collar couplings, are connected in a rotationally fixed manner to the two output shafts 9a, 9b of the gear unit 10. The gear unit 10, a reduction gear unit, is coupled to the motor 12 via a switchable clutch 11 which is a pneumatically switchable clutch or an electromagnetically switchable clutch. The rotation of the motor output shaft is thus transmitted via the clutch 11 to the gear unit 10 which is transmitted via the gear unit output shafts 9a, 9b and the connecting elements 8a, 8b to the screw shafts 5a, 5b.

Furthermore provided is a controller installation 13 which controls the operation of the essential or of all components of the extruder 1. As illustrated, said controller installation 13 may control the operation of the infeed installation 6, on the one hand, and also the heating installation 7. Said controller installation 13, via an inverter 14, moreover also controls the operation of the motor 12, in order to control the torque generated, or supplied, respectively, by the motor 12, and the revolutions of said motor 12.

The controller installation 13 furthermore also controls the switchable clutch 11. If said clutch is a pressure-loaded friction clutch, it may be actively switched in that the air pressure by way of which the friction-clutch disks are pressed together is controlled via the controller installation. Depending on how high the compression of the disks is, a variable level of torque may be transmitted, or a variably high cut-out torque in the case of any overload may be set, respectively. If the clutch 11 is an electromagnetically switchable clutch, via an electromagnet, two gear-tooth disks may be pressed together in a form-fitting manner, wherein, depending on how forcibly the disks are compressed, a variable level of torque may be transmuted, or a variably high cut-out torque, respectively, may be set. Irrespective of the specific implementation of the switchable clutch now, the clutch 11 may also be actively opened by corresponding activation of the same via the controller installation 13.

Furthermore provided are two measuring installations 15a, 15b, which, in the example shown, are assigned to the connecting elements 8a, 8b, that is to say to the two collar couplings. However, in the same manner, they may also be assigned to the output shafts 9a, 9b. The measuring installations 15a, 15b serve for individually registering separate actual torques on the connecting elements 8a, 8b, or, if disposed thereon, on the output shafts 9a, 9b, respectively. These measuring installations 15a, 15b communicate with the controller installation 13, such that the registered actual torques are continuously relayed to the latter.

The measuring installations 15a, 15b are preferably measuring installations which operate in a non-contacting manner, preferably such which enable registration of a magnetic field, or the registration of a modification of the magnetic field, respectively. To this end, the connecting elements 8a, 8b are expediently entirely, or at least in portions, provided with permanent magnetization, such that, in consequence, they generate a permanent magnetic field. When assigning the measuring installations to the output shafts 9a, 9b, the output shafts are correspondingly magnetized. During operation, when torque is transmitted, mechanical loading of the respective connecting elements 8a, 8b, or of the output shafts 9a, 9b, respectively, takes place, said loading in turn leading to a modification of the magnetic field. The measuring installations 15a, 15b comprise corresponding magnetic sensors, for example in the form of Hall-type sensors, which register this magnetic field, or the modification of the field, respectively. By means of the respective measuring signal, the respective measuring installation 15a, 15b, or latest the controller installation 13, can now determine the respective actual torque being applied to the connecting element 8a, 8b, or to the output shaft 9a, 9b. This respective actual torque may be assigned to the respective screw shaft 5a, 5b; the actual torque being applied there essentially corresponds to the measured torque, since measuring takes place directly in the connecting region between the screw elements and the gear unit, and not in the clutch region. On the basis of these individual actual torque values, the controller installation is now capable of registering whether or not an operative situation exists that requires actively opening the clutch 11 and thus separating the gear unit 10 from the motor 12.

Such a condition may exist when one of the determined actual torques is higher than a torque limit value. Each screw shaft 5a, 5b is assigned a torque limit value which should not be exceeded. However, this may take place during operation, for example, when, by way of the infeed installation 6, only one of the screw shafts 5a, 5b is loaded. In this case, the cumulative value of the two individual actual torques may still be very much below the defined cumulative cutout torque of the clutch 11. Nevertheless, overloading of a screw shaft 5a, 5b has to be attended to. If this is identified by the controller installation 13, the clutch 11 is actively opened.

The controller installation 13 can also determine any difference between the two actual torques, that is to say any torque differential. If the latter is greater than a limit value, an extreme difference in the loading of the individual screw shafts 5a, 5b likewise exists. This may also indicate an overload situation which leads to actively opening the clutch 11.

Since the actual torques are continuously relayed via the measuring installations 15a, 15b to the controller installation 13, the latter can consequently register the temporal profile of the measured values determined in each case. Should a sufficiently steep increase, or gradient, respectively, of a determined torque value occur now, the controller installation can determine the gradient and compare it with a comparison gradient. If the increase is sufficiently steep, which would be established by way of the comparison, this may likewise display an overload situation; again, the controller installation 13 switches the clutch 11 so as to open.

Finally, on the basis of the temporal profile of the actual torque values, any potential oscillation of torque values may also be registered and the amplitude thereof may be determined. Slight oscillation typically exists; but if oscillation is excessive, this may also indicate a potential overload situation. If the comparison of the determined actual oscillation amplitude with a comparison amplitude now shows that the actual oscillation amplitude exceeds the comparison amplitude, this may also lead to actively opening the clutch.

The opening of the clutch 11 is also accompanied by the corresponding activation of the inverter 14 in order to reduce the revolutions of the motor 12, wherein this preferably takes place hi direct temporal conjunction with the opening of the clutch 11.

The invention claimed is:

1. Extruder comprising an operative unit composed of a cylinder and at least two screw shafts which are rotatably accommodated therein, a gear unit having at least two output shafts, wherein each output shaft, via a connecting element, is connected in a rotationally fixed manner to one screw shaft, a motor which drives the gear unit and is coupled to the gear unit via a clutch, and a controller installation, wherein each connecting element or each output shaft is assigned a separate measuring installation for determining an applied torque, wherein the measuring installations communicate with the controller installation which, depending on the individual determined torques, controls the clutch which is implemented as a switchable clutch wherein the controller installation is configured for opening the clutch both when one of the applied torques exceeds a torque limit value and also when the difference between the two applied torques exceeds a limit value.

2. Extruder according to claim 1, wherein the controller installation is furthermore configured for opening the clutch when the gradient of the increase of an applied torque exceeds a gradient limit value.

3. Extruder according to claim 1, wherein the controller installation is furthermore configured for opening the clutch when the temporal profile of an applied torque displays oscillation in which the amplitude is greater than a comparison amplitude.

4. Extruder according to claim 1, wherein the controller installation, simultaneously with or immediately after opening the clutch, activates a frequency inverter in order to reduce the revolutions of the motor.

5. Extruder according to claim 1, wherein the switchable clutch is a pneumatically actuatable clutch or an electromagnetically actuatable clutch.

6. Extruder according to claim 1, wherein the measuring installations are measuring installations which operate in a non-contacting manner.

7. Extruder according to claim 6, wherein the connecting elements or the output shafts have magnetization which generates a magnetic field which is modifiable depending on the given torque and which is registered by a magnetic-field sensor.

8. Extruder according to claim 1, wherein the measuring installation is an optical measuring installation.

9. Extruder according to claim 1, wherein the measuring installation has at least one strain gauge which is disposed on the connecting element or on the output shaft.

10. Method for operating an extruder comprising an operative unit composed of a cylinder and at least two screw shafts which are rotatably accommodated therein, a gear unit having at least two output shafts, wherein each output shaft, via a connecting element, is connected in a rotationally fixed manner to one screw shaft, a motor which drives the gear unit and is coupled to the gear unit via a clutch, and a controller installation, wherein each connecting element or each output shaft is assigned a separate measuring installation for determining an applied torque, wherein the measuring installations communicate with the controller installation; the method comprising the steps of, determining the applied torques at the separate measuring installations, and, opening the clutch, which is implemented as a switchable clutch, depending upon the individual applied torques, both when an applied torque exceeds a torque limit value and also when the difference between the two applied torques exceeds a limit value.

11. Method according to claim 10, further comprising, opening the clutch when a gradient of the increase of an applied torque exceeds a gradient limit value.

12. Method according to claim 10, further comprising, opening the clutch when the temporal profile of an applied torque displays oscillation in which the amplitude is greater than a comparison amplitude.

13. Method according to claim 10, further comprising, simultaneously with or immediately after opening the clutch, activating a frequency inverter in order to reduce the revolutions of the motor with the controller installation.

* * * * *